United States Patent [19]
Rogers, Jr.

[11] 3,973,786
[45] Aug. 10, 1976

[54] BELT RETRACTOR WITH WINDING PREVENTION MECHANISM

[75] Inventor: Lloyd W. Rogers, Jr., Utica, Mich.

[73] Assignee: General Motors Corporation, Detroit, Mich.

[22] Filed: Mar. 28, 1975

[21] Appl. No.: 563,199

[52] U.S. Cl. .............................................. 280/747
[51] Int. Cl.² ........................................ B60R 21/02
[58] Field of Search ............................ 280/150 SB; 242/107.4 A, 107.4 R

[56] References Cited
UNITED STATES PATENTS

| | | | |
|---|---|---|---|
| 3,692,328 | 9/1972 | Arlauskas | 280/150 SB |
| 3,797,603 | 3/1974 | Loomba | 280/150 SB |
| 3,848,888 | 11/1974 | Kazaoka | 280/150 SB |
| 3,869,098 | 3/1975 | Sprecher | 242/107.4 A |

Primary Examiner—Robert R. Song
Attorney, Agent, or Firm—C. E. Leahy

[57] ABSTRACT

A belt retractor for a vehicle occupant restraint system has a winding prevention mechanism which is interlocked to the vehicle door so as to cancel the winding prevention mechanism upon opening movement of the door. The retractor has a reel with a ratchet plate having ratchet teeth thereon. A control disc is frictionally clutched to the reel and is engageable with a spring biased pawl mounted on the housing to control movement of the pawl between a detenting position engaging the ratchet teeth to prevent reel rotation in the winding direction and an undetenting position disengaging the pawl from the ratchet teeth. A blocking disc is also frictionally clutched for rotation with the reel and is effective to capture and hold the pawl in undetenting position. Actuation and cancellation of this winding prevention mechanism is in response to a predetermined sequence of belt winding and unwinding movement. A plunger mounted on the vehicle body is engageable by the door for movement between a retracted position when the door is closed and an extended position when the door is open. A lever connects the pawl and the plunger to move the pawl from the detenting to the undetenting positions to thereby assure belt winding reel rotation by the winding spring whenever the vehicle door is moved to the open position.

4 Claims, 4 Drawing Figures

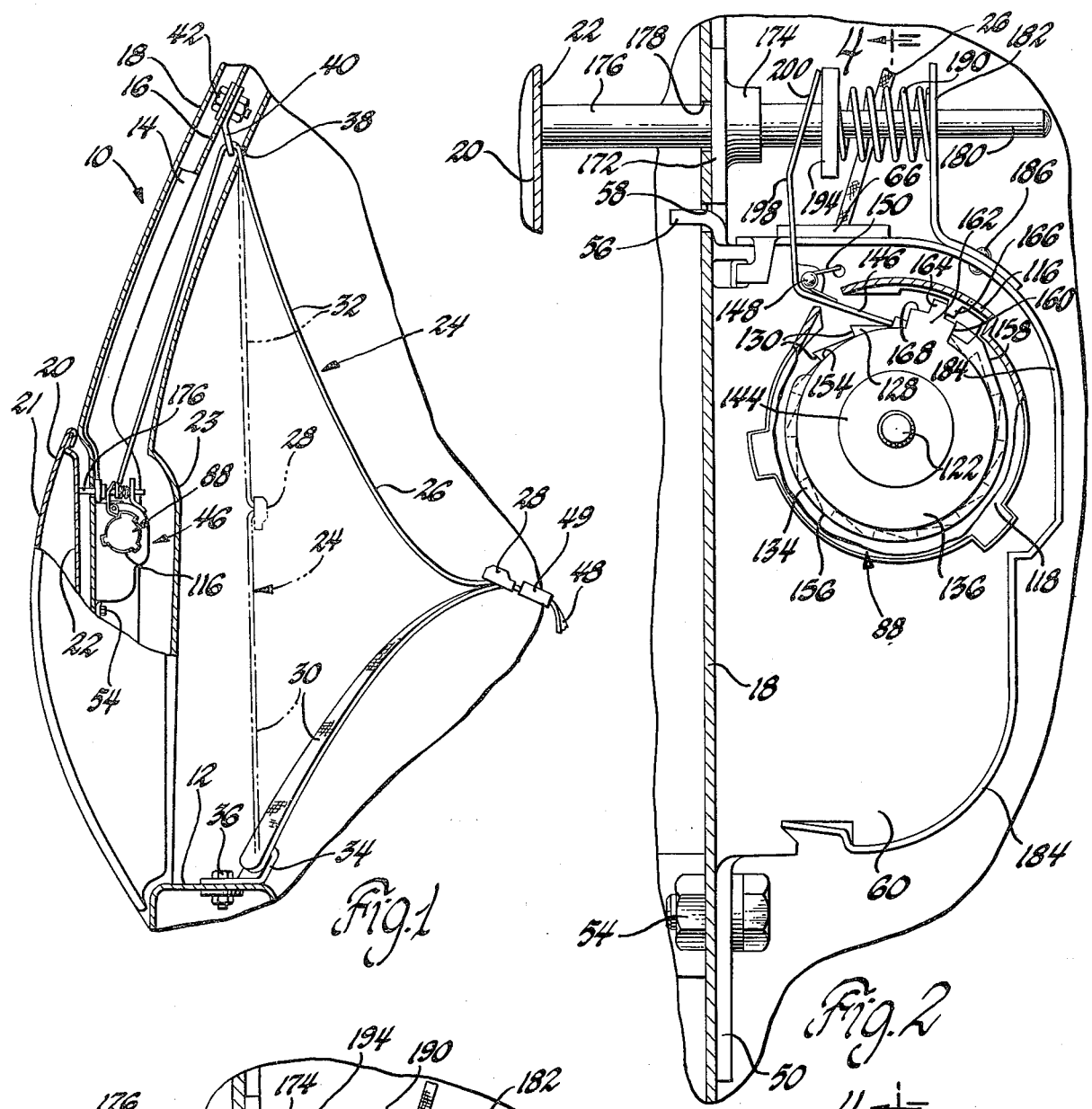
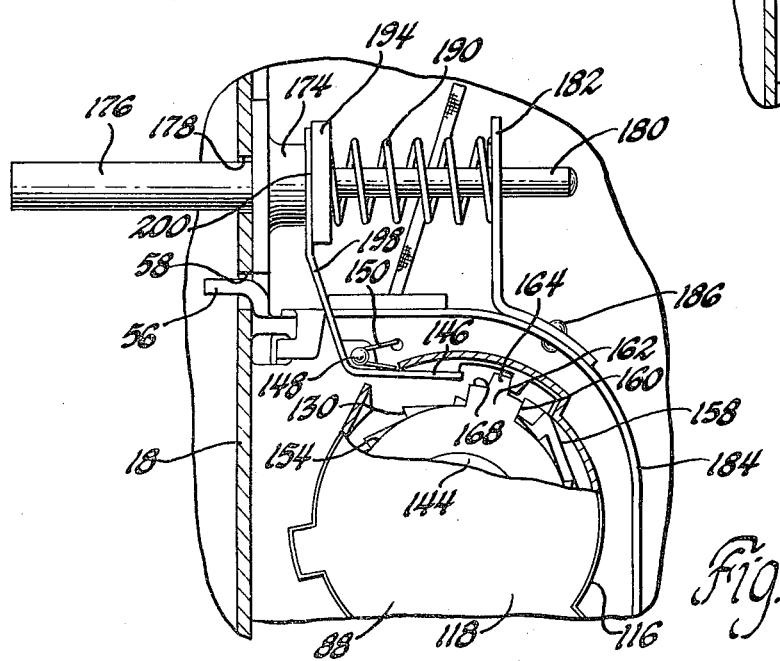

BELT RETRACTOR WITH WINDING PREVENTION MECHANISM

The invention relates generally to a belt retractor for a vehicle occupant restraint system and more particularly provides a winding prevention mechanism which is cancelled upon opening movement of the door.

Vehicle occupant restraint belt retractors have heretofore been provided with winding prevention mechanisms for selectively relieving the tension on the belt to enhance comfort of the restrained occupant. U.S. Pat. No. 3,869,098 by Raymond G. Sprecher discloses a belt retractor having a winding prevention mechanism which is actuatable by the occupant without occupant effort independent of the normal effort expended in unwinding the belt from the reel. In Sprecher, a control disc and a blocking disc are frictionally clutched to the reel for rotation therewith. The control disc controls movement of a spring biased pawl between a dententing position engaging ratchet teeth to prevent reel rotation in the winding direction and an undetenting position disengaging the pawl from the ratchet teeth. The blocking disc is effective to capture and hold the pawl in undetenting position. Actuation and cancellation of this winding prevention feature is in response to a predetermined sequence of belt winding and unwinding movement.

In a retractor having such a winding prevention mechanism, it is possible for the vehicle occupant to unbuckle the seat belt without having performed the conscious belt unwinding motion necessary to cause the control disc and blocking disc to move the pawl to undetenting position. Accordingly, the seat belt will not be retracted onto the reel when the occupant alights from the vehicle.

The present invention provides an improved belt retractor wherein the winding prevention mechanism is automatically cancelled by disengaging the pawl from the ratchet teeth to wind the belt whenever the door is moved from closed to open position. This assures retracton of the belt system to stored position to facilitate ease of occupant ingress and egress.

According to the invention, a pawl pivotally mounted on the retractor housing is selectively engageable with ratchet teeth to prevent winding rotation of the belt reel. A control disc and a blocking disc are frictionally clutched to the reel for movement therewith within limits of rotation and cooperate to control movement of the pawl between detenting and undetenting positions in response to winding and unwinding of the belt on the reel. A lever arrangement is provided which is operated in response to movement of the door from closed to open position. The lever is effective upon such actuation to move the pawl from the detenting to the undetenting position whereby belt winding reel rotation by the winding spring is assured whenever the vehicle door is moved to open position.

These and other features, objects and advantages of the invention will become apparent upon consideration of the specification and the appended drawings in which:

FIG. 1 is a sectional view through a vehicle body having a seat belt system employing a retractor according to the invention;

FIG. 2 is a sectional side elevation view of the belt retractor of FIG. 1 showing the vehicle door closed and the winding prevention mechanism in detenting position;

FIG. 3 is a view similar to FIG. 2 but showing the winding prevention mechanism in undenting position in response to opening movement of the vehicle door.

Figure 4:
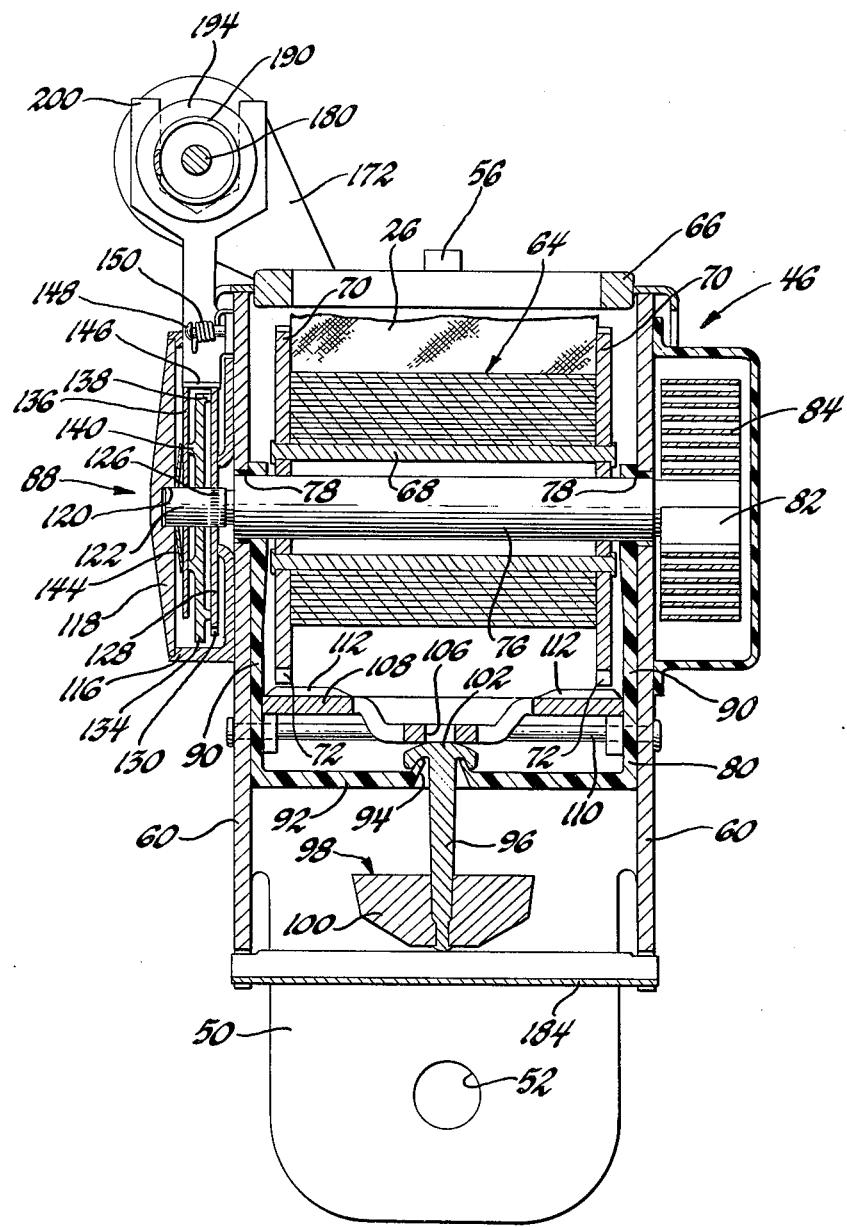
FIG. 4 is a sectional view taken in the direction of arrows 4—4 of FIG. 2 having parts broken away in a section.

Referring to FIG. 1, a vehicle body is generally indicated by numeral 10 and includes a vehicle floor 12. A side pillar 14 of the vehicle body 10 extends vertically from the floor 12 to the vehicle roof, not shown, and includes an inner panel 16 and an outer panel 18 which are conventionally welded together. A trim panel 23 covers the pillar 14 and faces toward the passenger compartment of the vehicle body 10. A front door opening of the body is defined in part by the pillar 14 and partly by a forward pillar, not shown. A door 20 comprised of an outer panel 21 and an inner panel 22 is conventionally mounted on the front pillar of the vehicle body 10 for swinging movement between the closed position of FIG. 1 and an open position.

An occupant restraint belt system of the vehicle is generally indicated by numeral 24 and includes a belt 26 along which a D-ring assembly 28 is slidably disposed to define a lap belt portion 30 and a shoulder belt portion 32. The lower end of the lap belt portion 30 is suitably secured to an attachment plate 34 which is in turn secured to the floor 12 outboard of the vehicle seat by a nut and bolt assembly 36. The upper end of the belt 26 extends through an aperture 38 in the trim panel 23 and extends slidably through an apertured ring member 40 which is attached to the inner panel 16 of the pillar 14 by a bolt and nut assembly 42. The shoulder belt portion 32 of the belt 26 then extends downwardly from the ring member 40 to a belt retractor, indicated generally at 46, which is suitably mounted on the pillar 14 and hidden from view by the trim panel 23. Inboard of the vehicle seat, the belt system includes a belt portion 48 having its lower end, not shown, suitably attached to the vehicle floor 12. A buckle 49 on the end of the belt 48 is engageable with the D-ring assembly 28 to position the seat belt lap portion 30 and shoulder belt portion 32 in restraining position about the seated occupant. The D-ring assembly 28 is slidable along the belt 26 so that the relative lengths of the lap belt portion 30 and shoulder belt portion 32 may be adjusted to suit the particular occupant.

When the D-ring assembly 28 is disconnected from the buckle 49, the retractor 46 withdraws belt 26 through the ring member 40 thereby causing the lap belt portion 30 and shoulder belt portion 32 to assume the phantom line indicated position in FIG. 1 wherein the belt 26 is stored along the pillar 14 so as to facilitate ease of occupant ingress and egress.

Referring to FIGS. 2 and 4, the seat belt retractor 46 of this invention will be described. The retractor 46 includes a housing having a base wall 50 having an aperture 52 that permits a nut and bolt assembly 54 to secure the lower end of the housing to the pillar 14. The upper end of the base wall 50 has a tab 56 located in an aperture 58 of the pillar outer panel 18 to complete this securement and positioning of the retractor 46 on the pillar 14 of the vehicle body 10. The retractor housing also includes spaced parallel side walls 60 that are formed integral with the base wall 50 as best seen in FIG. 4.

A belt reel, generally designated at 64, is rotatably mounted between the side walls 60 of the retractor housing and receives the end of belt 26 which extends through the opening of a belt guide 66 mounted in the upper end of the housing. The belt reel 64 includes an elongated drum 68 on which the belt 26 is wound and which extends between ratchet plates 70 on the opposite sides of the belt. The ratchet plates 70 are suitably fixed to the opposite ends of the belt drum 68 and have ratchet teeth 72 on the periphery thereof which face in the belt unwinding direction of reel rotation, this being the clockwise direction of rotation as viewed in FIG. 2. An elongated shaft 76 is received by the belt drum 68 and suitably fixed to the ratchet plates 70 as by splining. The ends of the shaft 76 are rotatably supported on the housing side walls 60 by bushing portions 78 of a pendulum support member 80. The FIG. 4 right-hand end of shaft 76 extends outwardly through the adjacent housing wall 60 and has a slot which receives the inner end 82 of a winding spring 84. The outer end of this winding spring, not shown, is suitably fixed to the adjacent housing side. wall 60 so that the belt reel 64 is normally biased in the belt winding direction to store the belt 26 on the belt reel 64. The left-hand end of the shaft 76 extends outwardly through the adjacent housing side wall 60 and is received by a winding prevention mechanism, generally designated by 88, which will be described hereinafter.

The pendulum support member 80 includes depending legs 90 which extend downwardly from the bushing portions 78 which encircle the ends of shaft 76. The lower ends of the legs 90 are connected by a base 92 which is oriented in a horizontal plane when the retractor 46 is mounted on the vehicle body. An aperture 94 in the base receives the stem 96 of a pendulum assembly 98. A weight 100 is mounted on the lower end of the stem 96 and the upper end of the stem has a control portion 102 which mushrooms outwardly to support the pendulum 98 on the base 92 of the pendulum support member 80. The control portion 102 is engaged by a downwardly stamped portion 106 on a locking member 108. The locking member 108 is pivotally supported by a apin 110 which extends between the housing side walls 60. The pendulum 98 swings from its vertically depending orientation of FIG. 4 to an inclined position in response to abrupt vehicle acceleration or deceleration in any horizontal direction. This swinging of the pendulum 98 causes the control portion 102 to pivot the locking member 108, causing laterally spaced locking tines 112 of the locking member 108 to engage the ratchet teeth 72 on the ratchet plates 70 to thereby block reel rotation in the belt unwinding direction. When the vehicle acceleration or deceleration terminates, gravity returns the pendulum 98 to its vertical position and likewise allows pivoting of the locking member 108 out of engagement with the reel ratchet teeth 72 so that belt unwinding is then permitted. Thus, the belt is locked against unwinding movement only when the pendulum 98 is caused to swing by abrupt vehicle deceleration ro acceleration.

Referring to FIGS. 2 and 4, movement of the belt 26 controls the winding prevention mechanism 88 to selectively prevent belt winding under the bias of the winding spring 84, thereby relieving the occupant of having the shoulder belt portion 32 pulled taut across his chest by the winding spring 84. This winding prevention mechanism 88 includes a housing 116 mounted on the housing side wall 60. A cover 118 closes the housing 116 and has a central bore 120 which receives a reduced diameter end portion 122 of the shaft 76. This end portion 122 of the shaft 76 has splines 126 that fix a ratchet plate 128 to the shaft for rotation with the belt reel 64. As seen in FIG. 2, the ratchet plate 128 is circular and has ratchet teeth 130 displayed on its periphery and facing in the counterclockwise belt direction of reel rotation, oppositely of the teeth 72 on the ratchet plates 70.

A generally circular control disc 134 is located adjacent the ratchet plate 128 and has a central bore that rotatably receives the reduced diameter end portion 122 of the reel shaft 76. A blocking disc 136 is located adjacent the control disc 134 and also has a central bore which rotatably receives the end portion 122 of shaft 76. The control disc 134 has an annular friction surface 138 which engages the adjacent face of ratchet plate 128 and an annular friction surface 140 which engages the blocking disc 136. A belleville spring 144 acts between the cover 118 and the blocking disc 136 to engage the blocking disc 136 against the control disc 134 and in turn engage the control disc 134 against the ratchet plate 128. Thus, the control disc 134 and blocking disc 136 are both clutched to the ratchet plate 128 for rotation therewith in the winding and unwinding directions.

Referring to FIG. 2 a pawl 146 of the winding prevention mechanism 88 is mounted on the housing side wall 60 by a pivot pin 148 which mounts the pawl 146 for movement between the detenting position of FIG. 2 wherein the end of the pawl engages ratchet teeth 130 to prevent winding rotation of belt reel 64 and an undetenting position shown in FIG. 3 wherein the pawl is disengaged from the ratchet teeth 130 to permit winding of the belt reel 64 by the winding spring 84. A spring 150 acts between the pawl 146 and housing side wall 60 to urge the pawl 146 to the detenting position of FIG. 1.

As best seen in FIG. 2, the control disc 134 has a notch 154, a control surface 156 and a radially raised cam surface 158, each extending circumferentially on the outer peripheral edge of the disc 134. The notch 154 has a radial diameter smaller than that of the ratchet teeth 130 so that when the control disc 134 is in its rotational position of FIG. 2 the notch 154 exposes the ratchet teeth 130 for engagement by the pawl 146. It will be apparent that as the control disc 134 is rotated from its FIG. 2 position, in the belt unwinding direction as the belt is unwound, the control surface 156 will move into engagement with the pawl 146 and lift the pawl 146 out of engagement with the ratchet teeth 130. Further rotation of the control disc 134 in the belt unwinding direction will cause the cam surface 158 to engage the pawl 146 and lift the pawl to a further undetenting position. The control disc 134 also has an axial projection 160 located just adjacent the cam surface 158 and which functions to limit rotation of the control disc 134 as will be discussed hereinafter.

The blocking disc 136, as best seen in FIG. 2, has a diameter less than the ratchet plate 128 except for an outwardly projecting blocking portion 162. The blocking portion 162 includes a radially outwardly projecting tip 164 which engages a stop 166 on the housing 116 to limit rotation of the blocking disc 136 in the belt unwinding direction of rotation. The blocking portion 162 also defines a notch 168 facing in the belt winding direction. The axial projection 160 of control disc 134 is engageable with the one side of the blocking portion 162 of blocking disc 136 to limit control disc rotation in the winding direction to the position of FIG. 2 wherein the notch 154 is aligned with the ratchet teeth 130. When the control disc 134 is moved in the unwinding direction, the axial projection 160 engages the other side of blocking portion 162 to thereby limit unwinding rotation of the control disc 134 to the position wherein the cam surface 158 engages the pawl 146 and maintains the pawl 146 in the further undetenting position in which the pawl is positioned in radial alignment with the notch 168 of blocking disc blocking portion 162. Subsequent belt unwinding reel rotation moves the blocking disc 136 in a belt winding direction causing the pawl 146 to be received in the notch 168 and held in the further undetenting position irrespective of rotation of the control disc 134 in the belt winding direction.

For a thorough discussion of the operation of the winding prevention mechanism, reference may be had to copending patent application Ser. No. 587,406, a Continuation-in-Part of Ser. No. 563,100 filed by Joseph J. Magyar, on even date herewith and assigned to the assignee of this invention. For present purposes, it will suffice to summarize the manner in which the control disc 134 and the blocking disc 136 cooperated with each other to control movement of the pawl 146 between detenting and undetenting positions.

In summary, as the belt 26 moves from its phantom line position of FIG. 1, the belt 26 is unwound from the retractor 46. During such unwinding of the belt 26 from the retractor 46, the control disc 134 rotates in the unwinding direction and the cam surface 158 engages pawl 146 moving it to the furthest undetenting position aligned with the notch 168 of blocking disc 136. After the occupant inserts the D-ring assembly 28 in the buckle 49, the slack remaining in the belt 26 will be taken up by the winding spring 84 of retractor 46 to pull the lap belt 30 and shoulder belt 32 taut against the occupant. This winding of the belt 26 causes the blocking disc 136 to move in the winding direction whereby the pawl 146 is captured in the notch 168 thereof and held in the furthest undetenting position as the central disc 134 continues to rotate in the winding direction until stopped by engagement of its axial projection 160 with the blocking portion 162 of the blocking disc 136. The occupant may then slightly unwind the belt from the retractor 46 to relieve tension on the belt. Such slight unwinding causes rotation of the blocking disc 136 in the belt unwinding direction which in turn releases the pawl 146 from the notch 168 allowing the spring 150 to move the pawl 146 into engagement of the ratchet teeth 130 as shown in FIG. 2. This engagement of the ratchet teeth 130 by the pawl 146 prevents winding movement of the reel by the winding spring 84. The comfort of the seat occupant is thereby enhanced by removing the annoyance of having the shoulder belt taut across his chest.

The operator can cancel operation of the winding prevention mechanism by unwinding the belt a sufficient extent to cause the cam surface 158 to engage pawl 146 and lift it again into alignment with the notch 168 in the blocking disc 136. Cancellation of the winding prevention mechanism in this manner may not always be convenient for the vehicle occupant. For example, the vehicle occupant may wish to simply unbuckle the D-ring assembly 28 from the buckle 49, open the door, and alight from the vehicle without the necessity of unwinding the belt to cancel the winding prevention mechanism. If the occupant does not perform the conscious effort of unwinding the belt to cancel the winding prevention mechanism, the belt will not be retracted by the retractor 46. The present invention provides a door actuated mechanism for cancelling the winding prevention mechanism without conscious effort of the occupant.

The door interlock mechanism includes an upwardly extending extension 172 on the housing base wall 50 and having a stamped apertured boss 174. A plunger 176 is slidably received in the boss 174 and extends through an aperture 178 in the pillar outer panel 18 and into engagement with the inner panel 22 of door 20. The inner end 180 of plunger 176 is necked down and slidably received in a bracket 182 which is attached to a cover 184 of the retractor by a rivet 186. A coil compression spring 190 encircles the end 180 of rod 176 and acts between the bracket 182 and a plate 194 mounted on the plunger 176 to urge the plunger 176 from a retracted position of FIG. 2 to the extended position of FIG. 3. FIG. 1 depicts the door 20 in closed position which holds the plunger 176 in the retracted position of FIG. 2 against the bias of spring 190.

The plunger 176 and the pawl 146 are interconnected by a lever portion 198 which is integral with the pawl 146 and extends upwardly therefrom to a forked end 200 which surrounds plunger 176 as seen in FIG. 4. When the door 20 is closed as in FIG. 2, the plunger 176 is withdrawn so that the plate 194 is spaced from the boss 174 of housing extension 172. Accordingly, the lever portion 198 of pawl 146 can move back and forth as necessary to permit movement of the pawl 146 between detenting and undetenting positions by the control disc 134 and blocking disc 136 as decribed hereinbefore. Whenever the vehicle door 20 is opened, as shown in FIG. 3, coil spring 190 forcibly moves the plunger 176 to its extended position in turn causing the plate 194 to move lever portion 198 leftwardly which pivots the pawl 146 about pivot 148 to its undetenting position of FIG. 3. This movement of the pawl 146 by the plunger 176 assures that the pawl 146 is moved to undetenting position independently of its prior positioning by the control disc 134 and blocking disc 136. Thus, if the vehicle occupant unbuckles the seat belt and opens the door without consciously unwinding the belt somewhat to cancel the winding prevention mechanism, this interlock to the door automatically moves pawl 146 to undetenting position and the winding spring 84 acts to wind the belt on the belt reel 64 whereby the belt is moved to the phantom line position of FIG. 1.

Thus, it is seen that an improved seat belt retractor is provided which will permit the occupant to enhance his comfort by relieving the belt tension acting on his chest and then automatically restore the bias of the winding spring to wind the belt whenever the vehicle door is moved from closed position to open position.

What is claimed is:

1. A vehicle occupant restraint belt retractor adapted to be mounted on a vehicle body having a door movable between open and closed positions, said retractor comprising:

a housing, a belt reel rotatably mounted on the housing, a restraint belt attached to the reel and wound and unwound thereon during reel rotation, a winding spring normally biasing the reel in the belt winding direction of rotation, means for selectively locking the belt reel against belt unwinding rotation, a ratchet wheel mounted on the belt reel for rotation therewith and having ratchet teeth facing in the belt winding direction, a detent member movable between a detenting position engaging the ratchet teeth of the ratchet wheel to prevent belt winding reel rotation and an undetenting position permitting belt winding reel rotation by the winding spring, control means responsive to belt movement by the occupant to move the detent member to detenting position to prevent winding of the reel and thereby prevent belt tension on the occupant, and means responsive to movement of the door from closed to open position to move the detent member to undetenting position upon opening movement of the door whereby belt winding reel rotation is permitted by the winding spring whenever the vehicle door is moved to open.

2. A vehicle occupant restraint belt retractor adapted to be mounted on a vehicle body having a door mounted in a door opening for movement between open and closed positions, said retractor comprising: a housing mounted on the vehicle body adjacent the door opening, a belt reel rotatably mounted on the housing, a restraint belt attached to the reel and wound and unwound thereon during reel rotation, a winding spring normally biasing the reel in the belt winding direction of rotation, means for selectively locking the belt reel against belt unwinding rotation, a ratchet wheel mounted on the belt for rotation therewith and having ratchet teeth facing in the belt winding direction, lever means pivotally mounted on the housing, one end of said lever means having a detent member movable between a detenting position engaging the ratchet teeth of the ratchet wheel to prevent belt winding reel rotation and an undetenting position permitting belt winding reel rotation by the winding spring, occupant actuatable control means for selectively operating the detent member between detenting and undetenting positions, the lever means having another end actuatable upon movement of the door from closed position to open position to operate the lever means and move the detent member to undetenting position independent of movement thereof by the operator actuable control means to thereby assure winding of the belt on the belt reel by the winding spring whenever the occupant moves the door to open position.

3. A vehicle occupant restraint belt retractor for a seat belt system restraining an occupant in a vehicle seat mounted on a vehicle body, the vehicle body having a first pillar mounted forward of the seat and a second pillar mounted rearward of the seat to define a door opening, and a door pivotally mounted on the first pillar for pivotal movement between open and closed positions, said retractor comprising; a housing mounted on the second pillar, a belt reel rotatably mounted on the housing, a restraint belt attached to the reel and wound and unwound thereon during reel rotation, a winding spring normally biasing the reel in the belt winding direction of rotation, means for selectively locking the belt reel against belt unwinding rotation, a ratchet wheel mounted on the belt reel for rotation therewith and having ratchet teeth facing in the belt winding direction, a detent member movably mounted on the housing for movement between a detenting position engaging the ratchet teeth of the ratchet wheel to prevent belt winding reel rotation and an undetenting position permitting belt winding reel rotation by the winding spring, a control disc frictionally clutched for rotation with the belt reel and having a peripheral edge engageable with the detent member for moving the detent member between the detenting and undetenting positions, the control disc moving the detent member to undetenting position upon substantial unwinding rotation of the belt reel, a blocking disc frictionally clutched to the reel for rotation therewith and being operative to capture and hold the detent member in the undetenting position in response to initiation of belt winding reel rotation subsequent to belt unwinding rotation which causes the control surface to move the pawl to undetenting position, said blocking disc releasing the detent member from the undetenting position to detenting position upon subsequent belt unwinding rotation by the occupant, plunger means mounted on the second pillar and engageable by the door for movement between a retracted position when the vehicle door is in closed position and an extended position when the vehicle door is in open position, and a lever interconnecting the plunger means and the detent member and normally permitting movement of the detent member by cooperation of the control disc and the blocking disc, the lever means being effective upon movement of the plunger to extended position upon opening movement of the door to move the detent member to undetenting position independent of unwinding movement of the belt by the occupant to move the detent member to undetenting position by engagement by the control disc.

4. A vehicle occupant restraint belt retractor adapted to be mounted on a vehicle body having a door movable between open and closed positions, said retractor comprising: a housing, a belt reel rotatably mounted on the housing, a restraint belt attached to the reel and wound and unwound thereon during reel rotation, a winding spring normally biasing the reel in the belt winding direction of rotation, means for selectively locking the belt reel against belt unwinding rotation, detent means actuatable between a detenting position locking the belt reel against belt winding reel rotation and an undetenting position permitting belt winding reel rotation by the winding spring, control means responsive to belt movement by the occupant to selectively actuate the detent means between detenting and undetenting positions, and door operated connecting means for actuating the detent means, the door operated connecting means having a first position corresponding to door closed position in which the door operated connecting means permits freedom of actuation of the detent means beteem detenting and undetenting positions by the control means, the door operated connecting means having a second position corresponding to door open position in which the detent means is actuated to the undetenting position.

\* \* \* \* \*